United States Patent
Cattaneo et al.

(10) Patent No.: US 9,921,934 B1
(45) Date of Patent: Mar. 20, 2018

(54) STORAGE PROCESS METRICS

(75) Inventors: Fiorenzo Cattaneo, Snoqualmie, WA (US); Kerry Q. Lee, Seattle, WA (US)

(73) Assignee: AMAZON TECHOLOGIES, INC., Seattle, WA (US)

( * ) Notice: Subject to any disclaimer, the term of this patent is extended or adjusted under 35 U.S.C. 154(b) by 1762 days.

(21) Appl. No.: 13/340,002

(22) Filed: Dec. 29, 2011

Related U.S. Application Data

(60) Provisional application No. 61/547,622, filed on Oct. 14, 2011.

(51) Int. Cl.
*G06F 15/173* (2006.01)
*G06F 11/34* (2006.01)
*H04L 29/08* (2006.01)

(52) U.S. Cl.
CPC ...... *G06F 11/3433* (2013.01); *H04L 67/1097* (2013.01)

(58) Field of Classification Search
CPC ............... H04L 29/08981; H04L 29/06; H04L 29/08072; H04L 41/5051; H04L 67/1097; G06F 11/3433; G06F 9/5005; G06F 9/5083
See application file for complete search history.

(56) References Cited

U.S. PATENT DOCUMENTS

| | | | |
|---|---|---|---|
| 8,175,863 B1 * | 5/2012 | Ostermeyer et al. | 703/22 |
| 8,352,608 B1 * | 1/2013 | Keagy et al. | 709/226 |
| 2005/0015371 A1 * | 1/2005 | Hetzler | G06F 11/1088 |
| 2006/0218243 A1 * | 9/2006 | Kudo et al. | 709/218 |
| 2007/0198802 A1 * | 8/2007 | Kavuri | 711/170 |
| 2007/0283107 A1 * | 12/2007 | Ozaki et al. | 711/154 |
| 2008/0301763 A1 * | 12/2008 | Sasaki et al. | 726/1 |
| 2010/0250732 A1 * | 9/2010 | Bucknell | 709/224 |
| 2011/0213829 A1 * | 9/2011 | Concini et al. | 709/203 |
| 2012/0123991 A1 * | 5/2012 | Arndt et al. | 706/50 |
| 2012/0124308 A1 * | 5/2012 | Harris, Jr. | G06F 11/2064 711/162 |
| 2012/0209568 A1 * | 8/2012 | Arndt et al. | 702/183 |

* cited by examiner

*Primary Examiner* — Abdullahi E Salad
(74) *Attorney, Agent, or Firm* — Knobbe, Martens, Olson & Bear, LLP

(57) ABSTRACT

Systems and methods are disclosed that facilitate the collection, transmission and processing of information related to the storage processes initiated in conjunction with virtual machine instances instantiated on a hosted virtual network. A virtual machine manager component, such a hypervisor component, receives a storage request from one or more virtual machine instances hosted on a host computing device. Additionally, the virtual machine manager component can further request via the storage protocol that the storage subsystem should collect and return storage process metric information. If the storage subsystem supports the collection of the storage process metric information, the storage subsystem will provide a response to the storage request and at least some of the requested storage process metric information. The virtual machine manager component can then process the response to the storage request as appropriate and forward any storage process metric information to a storage process metrics management component.

34 Claims, 6 Drawing Sheets

STORAGE PROCESS METRICS

CROSS-REFERENCE TO RELATED APPLICATION

This application claims the benefit of U.S. Provisional Patent Application No. 61/547,622, entitled STORAGE PROCESS METRICS, filed Oct. 14, 2011, the entirety of which is incorporated by reference herein.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources, often referred to as a hosted virtual network. Additionally, in some scenarios, the hosted virtual network can utilize one or more network-based services, such as a network-based storage service.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
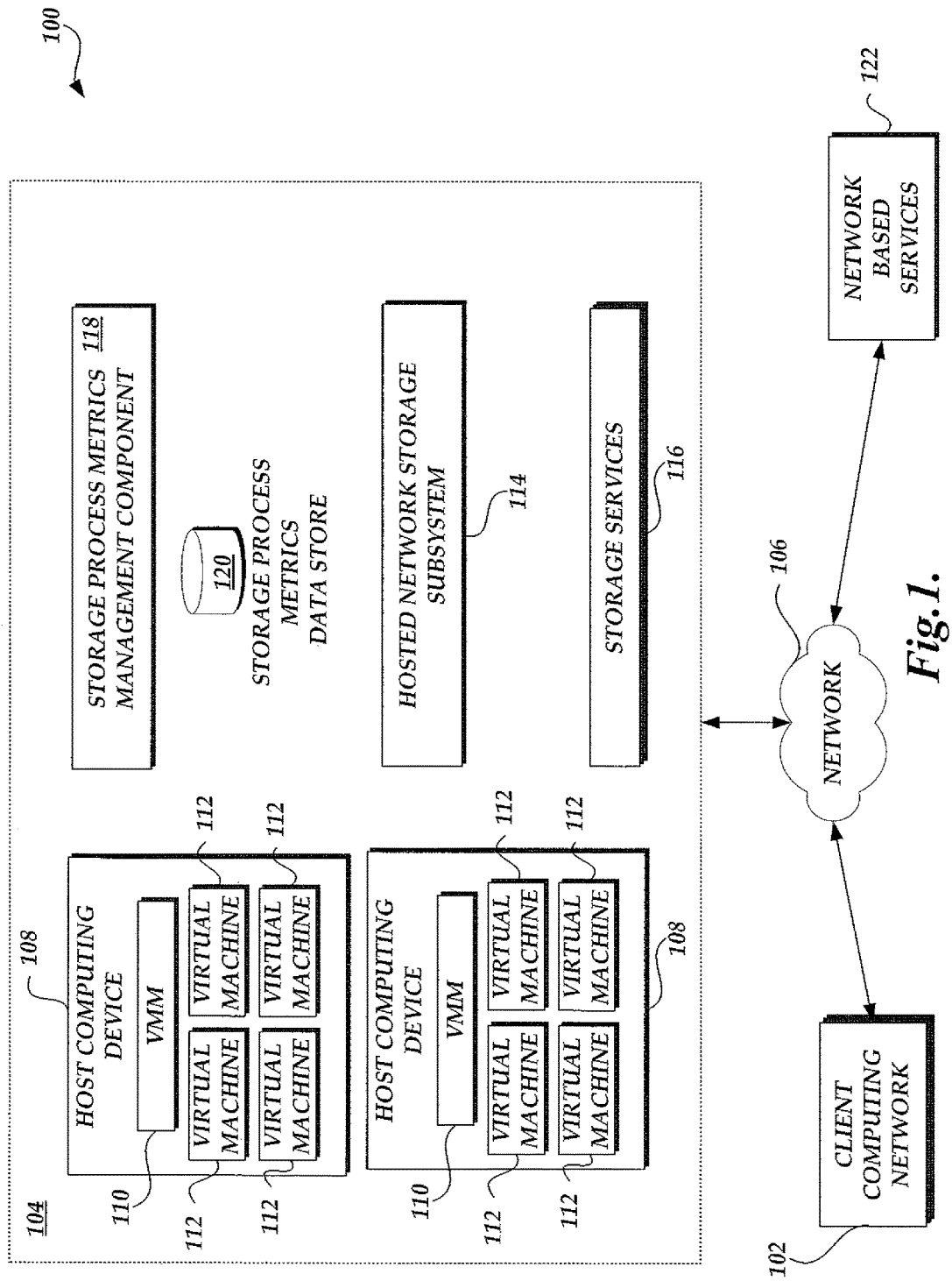
FIG. 1 is a block diagram depicting an illustrative virtual network environment for managing virtual machine instance types including a number of computing device networks, a number of host computing devices, and a workflow management component.

Generally described, aspects of the present disclosure relate to storage processes utilized in conjunction with a hosted storage subsystem. Specifically, in one embodiment, systems and methods are disclosed that facilitate the collection, transmission and processing of information related to the storage processes initiated in conjunction with virtual machine instances instantiated on a hosted virtual network. Illustratively, the storage processes can include any one of a variety of processes that can be requested or instantiated directly or indirectly by a virtual machine instance. In other embodiments, various storage processes may be initiated on the hosted storage subsystem by other computing devices, such as mobile computing devices and the like.

By way of an illustrative example, a virtual machine manager component, such a hypervisor component, receives a storage request from one or more virtual machine instances hosted on a host computing device. The virtual machine manager component utilizes one or more storage protocols, such as SCSI, iSCSI, Fibre Channel, Fibre Channel over IP, NDB, GNBD, etc. to issue storage requests to a storage subsystem. Additionally, the virtual machine manager component can further request via the storage protocol that the storage subsystem should collect and return information related to the processing of the storage request, generally referred to as storage process metric information. The storage processing subsystem receives and processes the storage request in accordance with the storage protocol utilized by the virtual machine manager component. Additionally, if the storage subsystem supports the collection of the storage process metric information, the storage subsystem will provide a response to the storage request (e.g., an acknowledge or failure indication) and at least some of the requested storage process metric information. The virtual machine manager component can then process the response to the storage request as appropriate and forward any storage process metric information to a storage process metrics management component. The storage process metrics management component can then process the collected storage process metric information for a variety of purposes.

Although aspects of the present disclosure will be described with regard to an illustrative environment and component interactions, communication and storage protocols, and flow diagrams, one skilled in the relevant art will appreciate that the disclosed embodiments are illustrative in nature and should not be construed as limiting. For example, although the present disclosure references a virtual machine instance for illustrative purposes, one skilled in the relevant art will appreciate that the processes and methodologies of the present disclosure may be applicable to computing devices, which may also be referred to as a wireless computing device, a mobile communication device, or a computing device. In another example, although the present disclosure references storage protocols for illustrative purpose, one skilled in the relevant art will appreciate that aspects of the command for collecting processing metrics may also be applicable in conjunction with other communication protocols. Accordingly, reference to a virtual machine instance, hosted virtual network, storage protocols and the like should not be interpreted as including any particular functionality or operation not described in the present disclosure.

FIG. 1 is a block diagram illustrating an embodiment of a virtual network environment 100. The virtual network environment 100 includes one or more client computing device networks 102 in communication with a virtual network 104 via a communication network 106. In one embodiment, the client computing device networks 102 can correspond to one or more computing devices that are controlled on or behalf of a user or organization that is a customer of a service provider associated with the virtual network 104 (such as a system administrator). The communication network 106 may be, for instance, a wide area network (WAN), metro area network (MAN), local area network (LAN), or a global communications network. Illustratively, the communication network 106 can correspond to any suitable network or combinations of networks in which suitable routing and communication is available between the components of the virtual network environment 100.

The virtual network 104 can include multiple physical computing devices, generally referred to as host computing devices 108. In one embodiment, the host computing devices 108 are capable of hosting multiple virtual machine instances 112 and typically can include a virtual machine manager component 110, often referred to as a hypervisor component. At least some of the virtual machine instances 112 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 104 is logical in nature and can encompass host computing devices 108 from various geographic regions. Additionally, although the host computing devices 108 will be discussed with regard to hosted virtual machine instances 110, one or more of the host computing devices may be physical computing devices configured to provide specified functionality in the virtual network 104 without hosting virtual machine instances. Accordingly, reference in the illustrative examples and embodiments to host computing devices 108 or host computing device can include host computing devices hosting virtual machines 110 or computing devices that do not host virtual machine instances often referred to as "bare metal" or physical machine instances.

The virtual network 104 includes a hosted network storage subsystem 114 for processing storage requests initiated by virtual machine instance 112 and transmitted by the virtual machine manager component 110. Illustratively, the virtual machine manager component 110 can transmit requests to the hosted network storage subsystem 114, e.g., non-local block based storage, encoded according to one or more storage protocols. In an example embodiment, to execute storage requests, hosted network storage subsystem 114 can utilize one or more storage services 116 that may be part of the hosted virtual network 104. For example, the one or more storage services 116 can include a server block data storage system. In this example, the server block data storage system can control one or more storage devices, such as hard disks, solid-state storage devices, non-volatile ram, etc., that are distributed across multiple physical storage servers.

Illustratively, when the hosted network storage subsystem 114 receives a storage IO request (e.g., a read or write request) it can send the request to the appropriate physical storage devices. However, it should be appreciated that other storage operations can be executed in certain protocols. For example, in accordance with SCSI implementations, a number of requests, such as SCSI Reservation commands, or third party specified specific extensions such as Snapshot commands may also be received by the hosted network storage subsystem 114.

Additionally, the hosted network storage subsystem 114 may also utilize one or more network based services 122, such as a network based storage service via communication network 106. In another example configuration, hosted network storage subsystem 114 could be integrated with a Storage Area Network (SAN) target. In this example, a host computing device can include a driver that issues storage IO requests (e.g., storage IO request encoded according to the Internet Small Computer System Interface (iSCSI), Fibre Channel, Fibre Channel over IP, network block device (NBD) or global network block device (GNBD) protocols) to the SAN target. In another example configuration, hosted network storage subsystem 114 could be integrated with a Redundant Array of Independent Drives (RAID). Similar to the SAN target example configuration, a host computing device can include a driver that issues storage IO requests to the RAID array that are encoded according to a protocol including, but not limited to SCSI, Advanced Technology Attachment (ATA), Serial ATA (SATA), serial attached SCSI (SAS), and the like.

As described in more detail in subsequent paragraphs, hosted network storage system 114 can obtain storage process metric information, e.g., hosted network storage system 114 can generate such information or receive such information from storage services 116 or the like, and provide it to host computing devices 108. For example, in response to a storage IO request from a host computing device 108, hosted network storage system 114 can encode at least a portion of the storage process metric information into a storage IO response that can be sent to the host computing devices 108 that issued the storage IO request. The host computing device 108 can receive the storage IO response and the storage process metric information can be extracted by the virtual machine manager components 110. As will also be described in greater detail below, in some embodiments the hosted network storage subsystem 114 may utilize, or otherwise be configured to set, flags in the storage IO request to request all, a subset or none of the metric information.

The virtual network 104 also includes a storage process metrics management component 118 for receiving storage process metric information from one or more virtual machine manager components 110. In one aspect, the storage process metrics management component 118 can configure the type of information requested by the virtual machine manager components 110 to the hosted network storage subsystem 114. In another aspect, the storage process metrics management component 118 can process collected storage process metric information to generate information related to the operation of the hosted network storage subsystem 114, the storage services 116 or network based storage services 122. For example, the storage process metrics management component 118 may provide information response to an API or user interface that provides storage process metric information associated with IO requests issued by one or more virtual machine instances 112 and processed by the storage services 116 or network based storage services 122. It should be appreciated that, although the storage process metrics management component 118 is depicted for the purpose of example as a single, stand alone logical component in illustrative FIG. 1, the routines and steps performed by the storage process metrics component 118 may be distributed among any number of components and executed in hardware or software. For example, multiple storage process metrics management component 118 may be implemented in the virtual network 104, such as hosted in a number of virtual machine instances 112. Additionally, although the storage process metrics component 118 is illustrated as logically associated within the virtual network 104, the storage process metrics component 118 may be implemented in a separate networked environment, in conjunction with client computing device networks 102, or otherwise integrated into other components/systems of the virtual network 104.

With continued reference to FIG. 1, the virtual network 104 can further include a storage process metrics data store 120 for maintaining, at least in part, information related to the configuration of the collection of storage process metric information or collected storage process metric information. Illustratively, the storage process metrics data store 120 may correspond to network attached storage (NAS), database servers, local storage, or other storage configurations which may be implemented in a centralized or distributed manner. Additionally, although the storage process metrics data store 120 is illustrated as a single data store, one skilled in the relevant art will appreciate that the workflow specification data store may be integrated or combined with one or more of the data stores provide additional or alternative functionality to the virtual network 104.

Figure 2A:
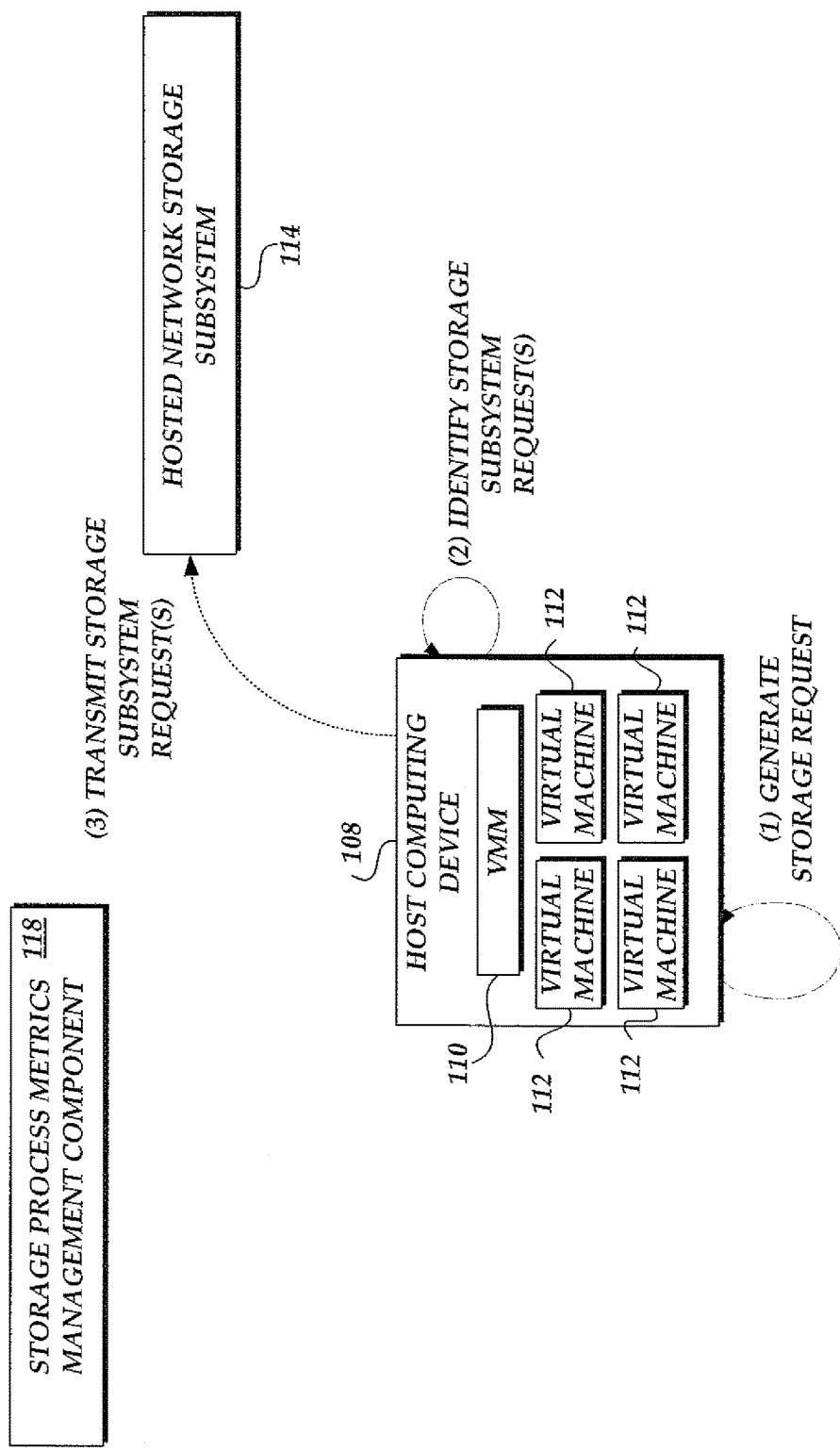
FIGS. 2A-2C are simplified block diagrams of the virtual network environment of FIG. 1 illustrating the processing of a series of actions corresponding to the generation and processing of storage requests and the collection of storage process metrics.
Figure 2B:
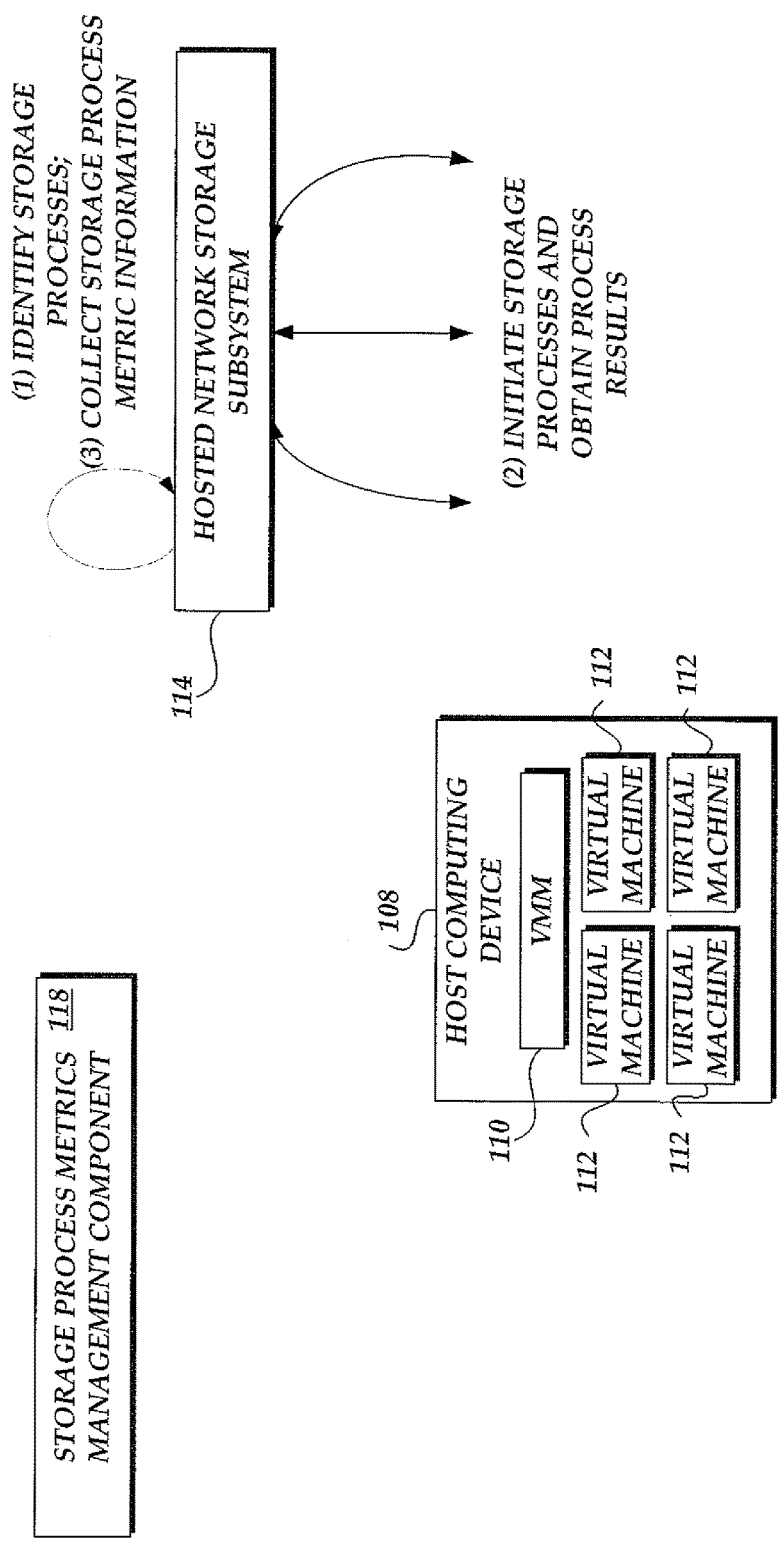
Figure 2C:
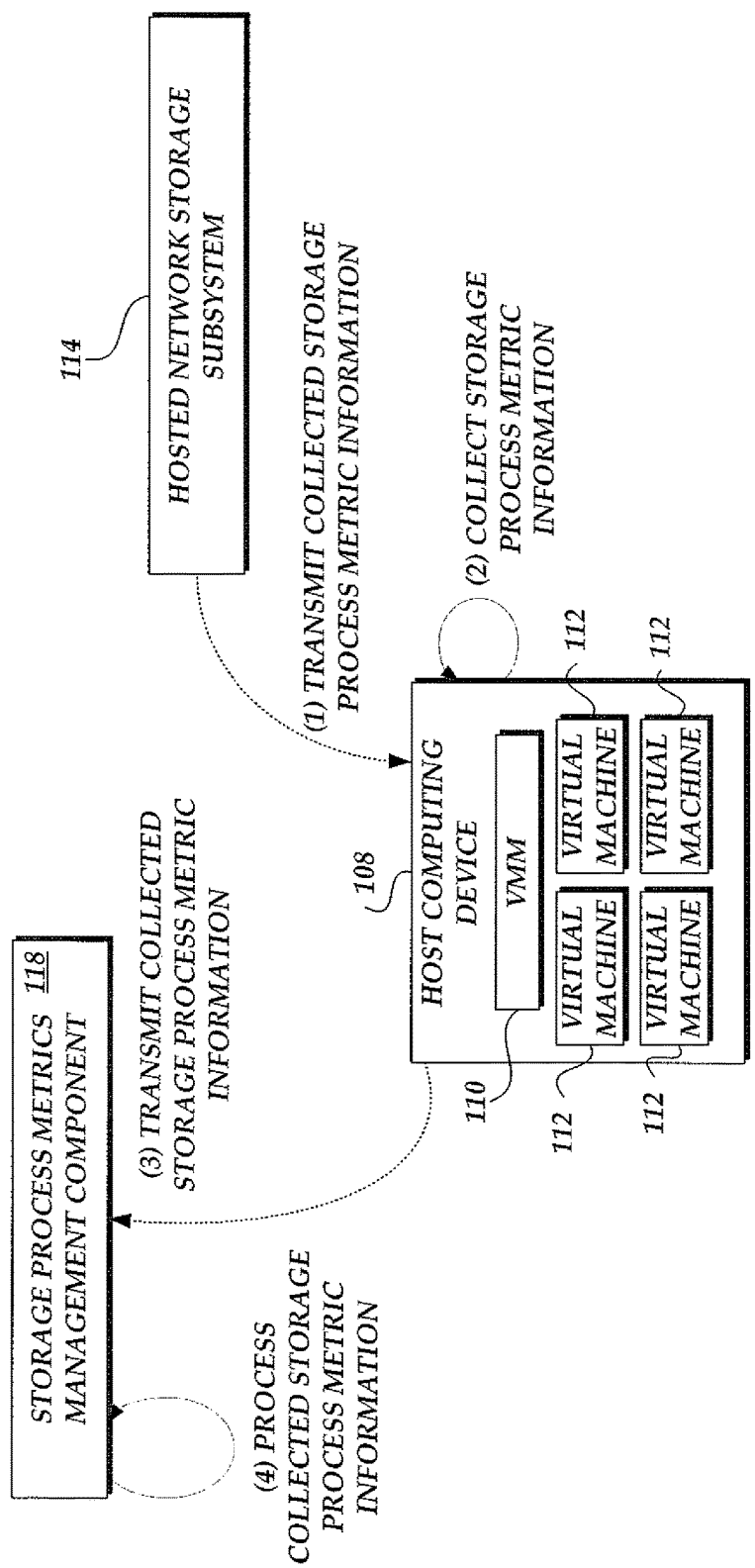

Turning now to FIGS. 2A-2C, a simplified block diagram of the virtual network environment 100 of FIG. 1 illustrating the selection and execution of storage requests initiated by one or more virtual machine instances 112 will be described. For purposes of illustration, many of the components of the virtual network environment 100 have been omitted. However, one skilled in the relevant art will appreciate that the illustrated interaction between components may utilize the omitted components or additional components not previously illustrated in FIG. 1.

With reference to FIG. 2A, in one embodiment, one or more virtual machine instances 112 can generate storage requests related to the execution of various applications or processes on the virtual machine instance. Illustratively, the storage requests are obtained by a virtual machine manager component 110 to generate one or more appropriate storage requests that should be transmitted to the hosted network storage subsystem 114. For example, the virtual machine manager component 110 can transmit IO requests (e.g., a request that specifies that the request is a read, a block storage disk offset, and a byte or block length) for reading information from hosted network storage subsystem 114 or writing information to the hosted network storage subsystem 114. The virtual machine manager component 110 then transmits the request to the hosted network storage subsystem 114. Illustratively, as part of request, the virtual machine manager component 110 can identify whether storage process metric information should be collected with regard to the storage request. In one example, the collection of storage process metric information can be toggled for specific types of requests or to management the amount of storage process metric information that is collected. In another example, the hosted virtual network 104 can be configured in a diagnostic mode related to the collection and processing of storage process metric information. In a specific example, the virtual machine manager component 110 can selectively enable or disable the collection of storage process metric information on a per storage IO request basis by setting a bit, or other flag, in an IO storage request conforming to a storage protocol, such as SCSI.

With reference to FIG. 2B, upon receipt of the storage request, the hosted network storage subsystem 114 identifies one or more storage processes that correspond to the received requested storage request. Illustratively, the hosted network storage subsystem 114 can initiate a number of processes in order to execute and complete a received request. Additionally, in some embodiments, the processing of one or more of the initial storage processes may cause the hosted network storage subsystem 114 to initiate additional processes. More specifically, in one instance, the execution of a first process may trigger an exception condition that results in additional processes being initiated. For example in the case of hierarchical storage, the requested block may have to be fetched from another data store. As previously described, the hosted network storage subsystem 114 can initiate storage processes the storage services 116, the network based storage services 122, or a combination.

Based on execution of the processes, the hosted network storage subsystem 114 then collects storage process metric information. Illustratively, the storage process metric information can include, but is not limited to, information associated with the particular processing of the request such as time stamps or other timing information, performance counters, trace information, mapping information, exception conditions, process or component identifiers, and the like. In another aspect, the storage process metric information can include general system level information about the storage services 116 or network based storage services 122, such as the number of processes being processed, health check information, timing information, and the like. One skilled in the relevant art will appreciate that additional or alternative information may also be considered part of the storage process metric information that is collected. Additionally, in some embodiments, the hosted network storage subsystem 114 may be configured to collect specific types of storage process metric information or specific identified storage process metric information. For example, the hosted network storage subsystem 114 may be able to filter or exclude non-desired information. Additionally, the hosted network storage subsystem 114 may be able to do some processing of the collected storage process metric information.

Turning now to FIG. 2C, the hosted network storage subsystem 114 transmits the collected storage process metric information in response to the storage request transmitted by the virtual machine manager component 110. The collected storage process metric information can be transmitted in the same communication, one or more separate communications or be provided via a references (such as a pointer or other identifier). In an example configuration, the collected storage process metric information can be sent along with a storage request response. For example, the collected storage process metric information could be sent with an "Acknowledgement" indicating that an IO write was successfully applied (in the instance that the IO request was a write) or with data (in the instance that the IO request was a read). Additionally, while most IO requests are READ and WRITE, one skilled in the art will appreciate that other protocol-specific operations such as SCSI reservation requests, vendor-specific operations such as SNAPSHOT request, could also include the collected storage process metric information in the reply. In another example, the hosted network storage subsystem 114 can utilize one or more specific messaging formats or commands that are designed to provide the collected storage process metric information.

The virtual machine manager component 110 obtains the response and the collected storage process metric information. In one aspect, the virtual machine manager component 112 processes the response to the storage request in accordance with the storage protocol utilized to transmit the request (e.g., processing an acknowledgement or failure response). In another aspect, if collected storage process metric information is included in the response, the virtual machine manager component 110 can transmit (or store) the information for further processing. Illustratively, the virtual machine manager component 110 does not need to include the logic or instructions for analyzing the collected virtual machine manager component. Alternatively, the virtual machine manager component 112 may be able to conduct some processing as well.

Based on the collected storage process metric information, the storage process metrics component 118 can then process the information for a variety of purposes. One example includes making assessments regarding the performance of the hosted network storage subsystem 114, the storage services 116 or network based storage services 122. Another example includes making assessments regarding the physical or logical mapping of components or subcomponents of the storage services 116 or network based storage services 122. In a further example, the storage process metrics component 118 can determine whether service level commitments have been met for particular hosted virtual networks, such as for a particular customer or data center. Additional or alternative processing implemented by the storage process metrics component 118 can also be applied. The processed information can be provided to various individuals, such as system administrators, customers and the like.

Figure 3:
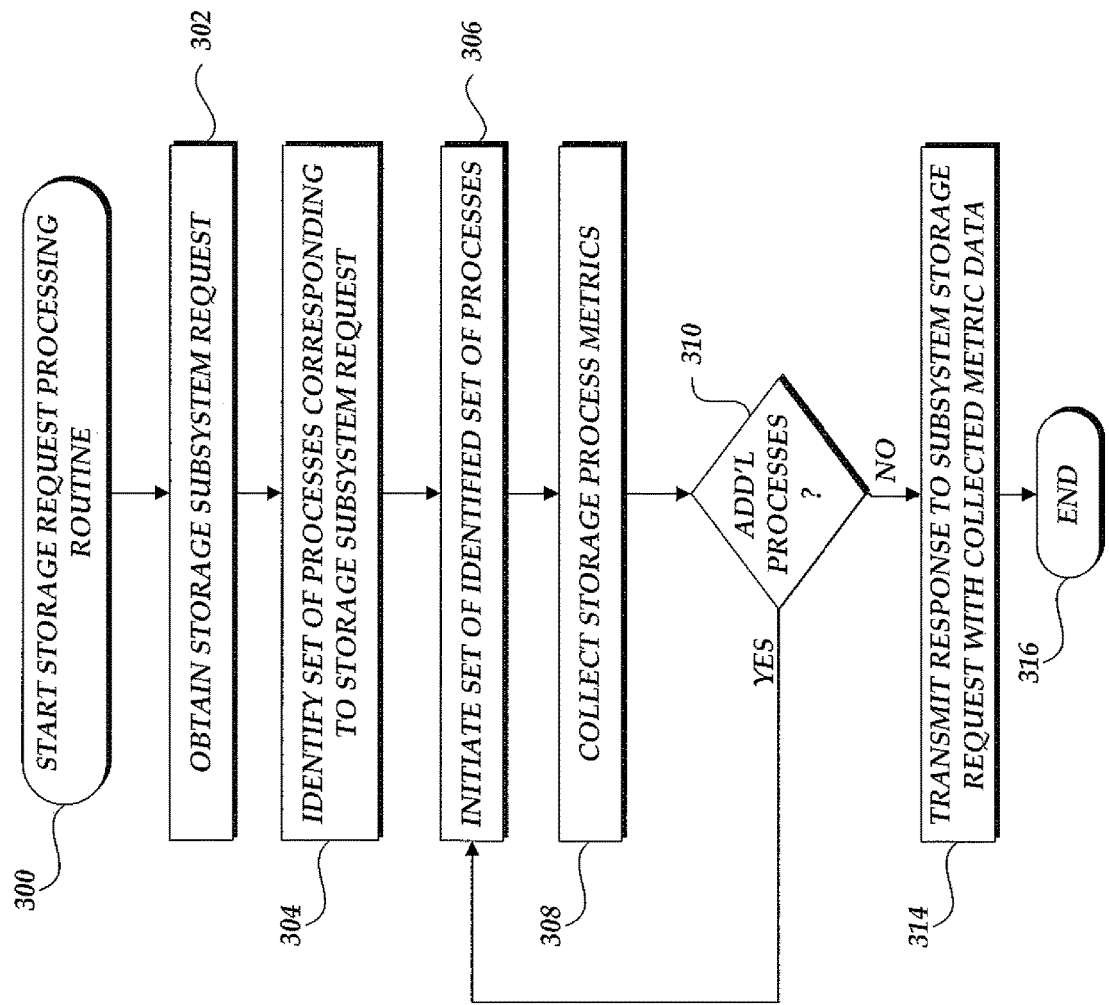
FIG. 3 is a flow diagram illustrative of a storage request processing routine implemented by a storage subsystem.

FIG. 3 is a flow diagram illustrative of a storage request processing routine implemented by a hosted network storage subsystem 114.

At block 302, the hosted network storage subsystem 114 obtains a storage subsystem request. As previously described, illustratively, a virtual machine manager component 110 can transmit IO requests (e.g., a request that specifies that the request is a read, a block storage disk offset, and a byte or block length) for reading information from hosted network storage subsystem 114 or writing information to the hosted network storage subsystem 114. The virtual machine manager component 110 then transmits the request to the hosted network storage subsystem 114.

At block 304, the hosted network storage subsystem 114 identifies one or more storage processes that correspond to the received requested storage request. At block 306, the hosted network storage subsystem 114 can then initiate a number of the identified processes in order to execute and complete a received request. As previously described, the hosted network storage subsystem 114 can initiate storage processes the storage services 116, the network based storage services 122, or a combination.

Based on execution of the processes, the hosted network storage subsystem 114 then collects storage process metric information. Illustratively, the storage process metric information can include, but is not limited to, information associated with the particular processing of the request such as time stamps or other timing information, performance counters, trace information, mapping information, exception conditions, process or component identifiers, and the like. In another aspect, the storage process metric information can include general system level information about the storage services 116 or network based storage services 122, such as the number of processes being processed, health check information, timing information, and the like. One skilled in the relevant art will appreciate that additional or alternative information may also be considered part of the storage process metric information that is collected. Additionally, in some embodiments, the hosted network storage subsystem 114 may be configured to collect specific types of storage process metric information or specific identified storage process metric information. For example, the hosted network storage subsystem 114 may be able to filter or exclude non-desired information. Additionally, the hosted network storage subsystem 114 may be able to do some processing of the collected storage process metric information.

In some embodiments, the processing of one or more of the initial storage processes may cause the hosted network storage subsystem 114 to initiate additional processes. More specifically, in one instance, the execution of a first process may trigger an exception condition that results in additional processes being initiated. For example in the case of hierarchical storage, the requested block may have to be fetched from another data store. In another instance, the execution of the first process may elicit additional processes that are considered typical or expected actions. Still further, the hosted network storage subsystem 114 may be configured to collect additional storage process metric information independent of the transmitted request. Accordingly, at decision block 310, a test is conducted to determine whether additional processes are to be executed. If so, the routine 300 returns to block 306 to initiate the additional processes and collect storage process metrics.

With reference again to decision block 310, if no additional processes remain to be executed, at block 312, the hosted network storage subsystem 114 transmits the response to the command with any collected storage process metric information. As previously described, the collected storage process metric information can be transmitted in the same communication, one or more separate communications or be provided via a references (such as a pointer or other identifier). In an example configuration, the collected storage process metric information can be sent along with a storage request response. For example, the collected storage process metric information could be sent with an "Acknowledgement" indicating that an IO write was successfully applied (in the instance that the IO request was a write) or with data (in the instance that the IO request was a read). Additionally, while most IO requests are READ and WRITE, one skilled in the art will appreciate that other protocol-specific operations such as SCSI reservation requests, vendor-specific operations such as SNAPSHOT request, could also include the collected storage process metric information in the reply. In another example, the hosted network storage subsystem 114 can utilize one or more specific messaging formats or commands that are designed to provide the collected storage process metric information. Still further, in other embodiments, the hosted network storage subsystem 114 may transmit at least a portion of the collected storage process metric information as soon as the information is collected without requiring completion of the processing of the entire storage request. In still further embodiments, the hosted network storage subsystem 114 can transmit batches of collected storage process metric information based on various criteria. At block 316, the routine 300 terminates.

Figure 4:
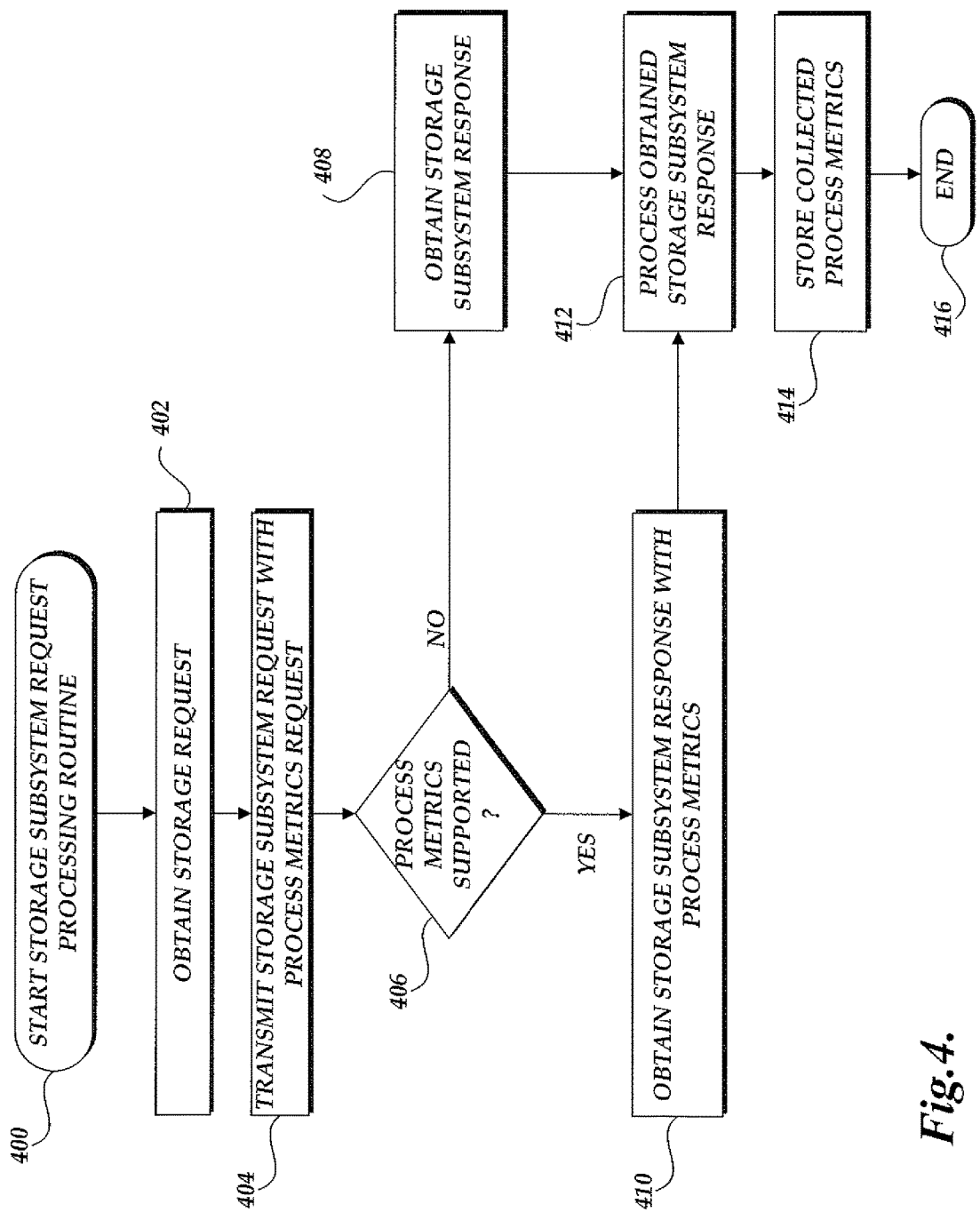
FIG. 4 is a flow diagram illustrative of a storage subsystem request processing request implemented by a virtual machine manager component.

Turning now to FIG. 4, a flow diagram illustrative of a storage subsystem request processing routine 400 implemented by a virtual machine manager component 110 will be described. Illustratively, in one embodiment, one or more virtual machine instances 112 can generate storage requests related to the execution of various applications or processes on the virtual machine instance. Accordingly, at block 402, the storage requests are obtained by a virtual machine manager component 110 to generate one or more appropriate storage requests that should be transmitted to the hosted network storage subsystem 114.

At block 404, the virtual machine manager component 110 transmits the storage subsystem request to a hosted network storage subsystem 114. For example, the virtual machine manager component 110 can transmit IO requests (e.g., a request that specifies that the request is a read, a block storage disk offset, and a byte or block length) for reading information from hosted network storage subsystem 114 or writing information to the hosted network storage subsystem 114. Illustratively, as part of request, the virtual machine manager component 110 can identify whether storage process metric information should be collected with regard to the storage request. In one example, the collection of storage process metric information can be toggled for specific types of requests or to management the amount of storage process metric information that is collected. In another example, the hosted virtual network 104 can be configured in a diagnostic mode related to the collection and processing of storage process metric information. In a specific example, the virtual machine manager component 110 can selectively enable or disable the collection of storage process metric information on a per storage IO request basis by setting a bit, or other flag, in an IO storage request conforming to a storage protocol, such as SCSI.

At decision block 406, a test is conducted to determine whether the hosted network storage subsystem 114 receiving the request is capable of supporting requests for collected storage process metric information. Illustratively, the receiving hosted network storage subsystem 114 may not be configured to support the collection storage process metric information. Accordingly, the receiving hosted network storage subsystem 114 may either provide a response to the transmitting virtual machine manager component 110 whether or not collected storage process metric information will be provided. In other embodiments, the receiving hosted network storage subsystem 114 may be configured, such as by one or more processes in the operating embodiment, to transmit metric information irrespective of the transmitted request.

If at decision block 406 the receiving hosted network storage subsystem 114 does not support the collection of storage process metric information, at block 408, the virtual machine manager component 110 obtains a response to the storage request from the hosted network storage subsystem 114. At block 412, the virtual machine manager component 110 processes the obtained hosted network storage subsystem 114 response. In this instance, the response may only include information related to the processing of storage request and may not have any of the requested storage process metric information.

Returning to decision block 406, if the collection of storage process metric information is supported by the receiving hosted network storage subsystem 114, at block 410, the virtual machine manager component 110 obtains the response and the collected storage process metric information. At block 412, the virtual machine manager component 112 processes the response to the storage request in accordance with the storage protocol utilized to transmit the request (e.g., processing an acknowledgement or failure response). In another embodiment, the response may only include a portion of the requested storage process metric information (such as some limited information provided by an operating system or software application). In a further embodiment, the response may include additional storage process metric information that was not part of the request. Accordingly, if collected storage process metric information is included in the response, the virtual machine manager component 110 can extract the included storage process metric information from the response. Illustratively, the virtual machine manager component 110 does not need to include the logic or instructions for analyzing the collected virtual machine manager component. Alternatively, the virtual machine manager component 112 may be able to conduct some processing as well.

At block 414, the virtual machine manager component 110 stores the collected process metric information. Illustratively, the collected storage process metric information can be stored in a memory location that can be accessed by one or more processes configured to transmit the collected storage process metric information to the storage process metric component 118. Alternatively, the virtual machine manager component 110 can also include additional logic or configures that facilitates the transmission of the collected storage process metric information to the storage process metrics component 118. At block 416, the routine 400 terminates.

As previously described, based on the collected storage process metric information, the storage process metrics component 118 can then process the information for a variety of purposes. One example includes making assessments regarding the performance of the hosted network storage subsystem 114, the storage services 116 or network based storage services 122. Another example includes making assessments regarding the physical or logical mapping of components or subcomponents of the storage services 116 or network based storage services 122. In a further example, the storage process metrics component 118 can determine whether service level commitments have been met for particular hosted virtual networks, such as for a particular customer or data center. Additional or alternative processing implemented by the storage process metrics component 118 can also be applied. The processed information can be provided to various individuals, such as system administrators, customers and the like.

The routines identified in FIG. 3 and FIG. 4 are illustrative in nature and should not be construed as limiting. Additionally, although the routines illustrated in FIGS. 3 and 4 are illustrated as being implemented by the hosted network storage subsystem 114 and virtual machine manager component 112, respectively, one or more aspects of the routine may be implemented by additional or alternative components.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing storage processes comprising:
one or more computing devices having a processor and a memory, the one or more computing devices executing one or more virtual machine manager components operable to receive a storage request from an instantiated virtual machine and generate a command responsive to the storage request, the generated command including a request to collect storage process metric information associated with the storage request;
one or more computing devices having a processor and a memory, the one or more computing devices executing one or more hosted storage subsystems operable to receive the command from the one or more virtual machine manager components, the command including the request to collect storage process metric information associated with the storage request; and
one or more computing devices having a processor and a memory, the one or more computing devices executing a storage process metric management component, wherein the storage process metric management component processes collected storage process metric information;
wherein the one or more hosted storage subsystems transmits collected storage process metric information as part of transmitting a result of the execution of the command generated by the one or more virtual machine manager components.

2. The system as recited in claim 1, wherein the one or more hosted storage subsystems initiates one or more processes for executing the received command from the one or more virtual machine manager components.

3. The system as recited in claim 2, wherein the result from the one or more hosted storage subsystems includes a result from the initiation of additional process in response to an exception condition generated from initiation of the one or more processes for executing the received command from the one or more virtual machine manager components.

4. The system as recited in claim 1, wherein the generated command further includes configuration information identifying the storage process metric information to be collected.

5. The system as recited in claim 1, wherein the generate command corresponds to storage input/output command encoded in accordance with a communication protocol.

6. A method for processing storage process metric information, comprising:
obtaining, by a manager component, a storage request from a computing device;
in response to the storage request, transmitting, by the manager component, one or more commands to a storage subsystem, the one or more commands corresponding to the storage request and including a request for the collection of storage process metric information, the storage process metric information associated with the execution of the one or more commands corresponding to the storage request;
receiving, by the manager component, a response from the storage subsystem, the response including information associated with the one or more commands and at least one collected storage process metric associated with the execution of the one or more commands; and
processing, by the manager component, the response to make the collected storage process metric information available for further processing associated with performance of the hosted virtual network.

7. The method as recited in claim 6, wherein the response from the storage subsystem includes a result from initiation of one or more processes for executing the one or more commands received from the manager component.

8. The method as recited in claim 6, wherein the response from the storage subsystem includes a result from the initiation of additional process in response to an exception condition generated from initiation of one or more processes for executing the one or more commands received from the manager component.

9. The method as recited in claim 6, wherein transmitting one or more commands to a storage subsystem includes transmitting configuration information identifying the storage process metric information to be collected.

10. The method as recited in claim 9, wherein transmitting the configuration information includes transmitting the configuration information as part of transmitting the one or more commands.

11. The method as recited in claim 9, wherein the configuration information identifying the storage process metric information to be collected is included in the one or more commands received from the manager component.

12. The method as recited in claim 6 further comprising obtaining a confirmation regarding the collection of storage process metric information.

13. The method as recited in claim 6, wherein the one or more commands correspond to storage input/output command encoded in accordance with a communication protocol.

14. The method as recited in claim 13, wherein the communication protocol corresponds to a storage transport protocol.

15. The method as recited in claim 6, wherein the at least one collected storage process metric associated with the execution of the one or more commands includes information requested in the one or more commands received from the manager component.

16. The method as recited in claim 6, wherein the at least one collected storage process metric associated with the execution of the one or more commands includes one additional piece of storage process metric information not requested in the one or more commands received from the manager component.

17. The method as recited in claim 6, wherein the at least one collected storage process metric associated with the execution of the one or more commands includes at least one less storage process metric information than the storage process metric information requested in the one or more commands received from the manager component.

18. The method as recited in claim 6 further comprising obtaining a response from the storage subsystem indicative of a confirmation regarding the collection of storage process metric information.

19. The method as recited in claim 6, wherein processing the response to make the collected storage process metric information available for further processing associated with performance of the hosted virtual network includes making the storage process metric information available for transmission to at least one additional component.

20. The method as recited in claim 6, wherein processing the response to make the collected storage process metric information available for further processing includes causing the transmission of the collected storage process metric information to at least one additional component.

21. The method as recited in claim 20, wherein causing the transmission of the storage process metric information includes scheduling the transmission of the storage process metric information based scheduling criteria.

22. The method as recited in claim 6, wherein obtaining the storage request from a computing device includes obtaining a request from a virtual machine instance, the virtual machine instance corresponding to a hosted virtual network.

23. A method for managing storage process metric information, comprising:
    obtaining, by a network storage subsystem, a command corresponding to a storage request transmitted by a computing device, wherein the command is generated by a management component in response to the storage request and includes a request for collection of storage process information;
    initiating, by the network storage subsystem, one or more processes for executing the received command;
    collecting, by the storage subsystem, storage process metric information corresponding to the initiated one or more processes; and
    transmitting, by the network storage subsystem, information responsive to the command, wherein the information responsive to the command includes a result of the initiated one or more processes and the collected storage process metric information.

24. The method as recited in claim 23, wherein initiating one or more processes for executing the received command includes initiating a plurality of processes.

25. The method as recited in claim 23 further comprising obtaining an exception condition responsive to the initiated one or more processes.

26. The method as recited in claim 25 further comprising:
    initiating at least one additional process in response to the exception condition; and
    collecting storage process metric information corresponding to the initiated at least one additional process.

27. The method as recited in claim 23 further comprising obtaining configuration information identifying storage process metric information to be collected.

28. The method as recited in claim 27, wherein the configuration information identifying the storage process metric information to be collected is included in the received command.

29. The method as recited in claim 23 further comprising transmitting a confirmation regarding the collection of storage process metric information.

30. The method as recited in claim 23, wherein the command corresponds to storage input/output command encoded in accordance with a communication protocol.

31. The method as recited in claim 23, wherein initiating one or more processes for executing the received command corresponds to initiating at least one process on a component associated with the network storage subsystem.

32. The method as recited in claim 23, wherein initiating one or more processes for executing the received command corresponds to initiating at least one process on a network-based service.

33. The method as recited in claim 23, wherein collecting storage process metric information corresponding to the initiated one or more processes includes collecting only storage process metric information requested in the received command.

34. The method as recited in claim 23, wherein collecting storage process metric information corresponding to the initiated one or more processes includes collecting one additional piece of storage process metric information not requested in the received command from the virtual machine manager component.

* * * * *